July 17, 1928.  1,677,569
J. A. B. SMITH
ACCOUNTING MACHINE DEMONSTRATION CHART
Filed May 19, 1925  3 Sheets-Sheet 1
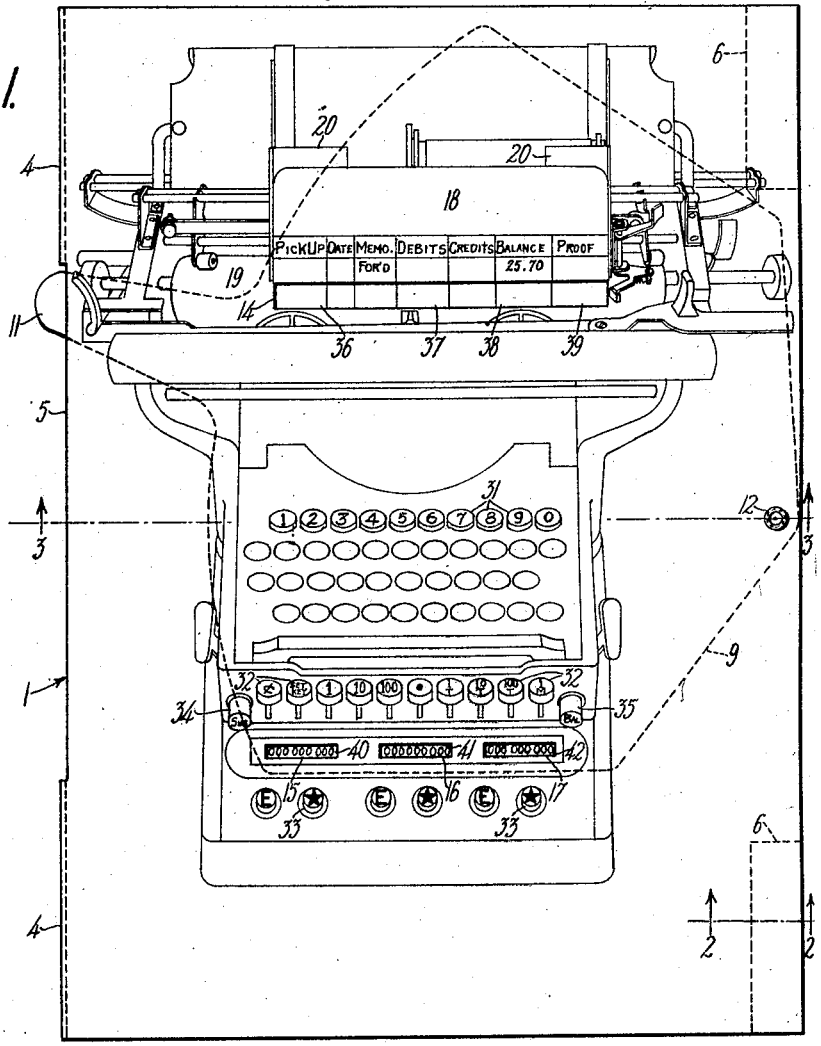
Fig.1.
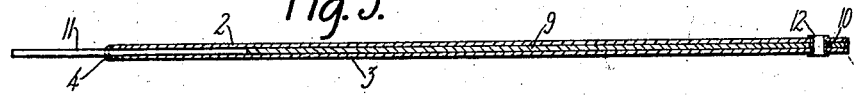
Fig.2.
Fig.3.
Inventor:
Jesse A. B. Smith
by B. C. Stickney
Attorney July 17, 1928.
J. A. B. SMITH
1,677,569
ACCOUNTING MACHINE DEMONSTRATION CHART
Filed May 19, 1925   3 Sheets-Sheet 3
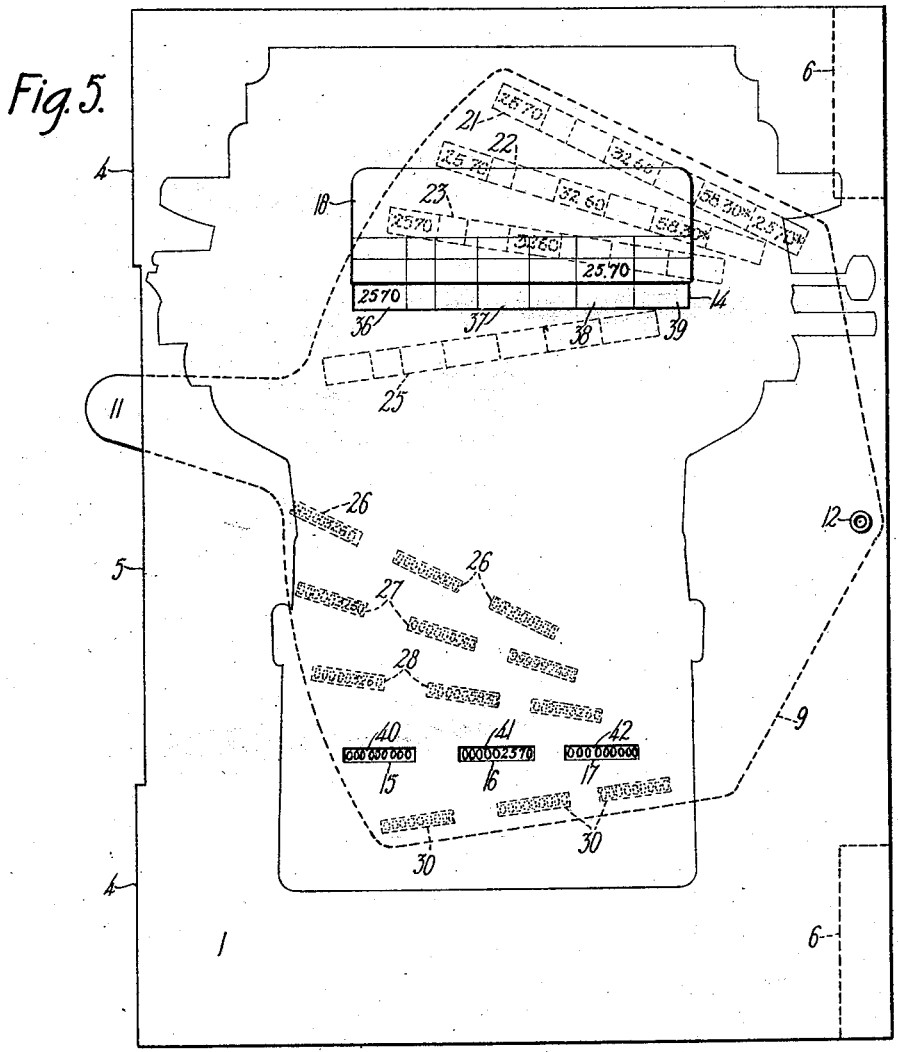
Fig. 5.
Fig. 6.
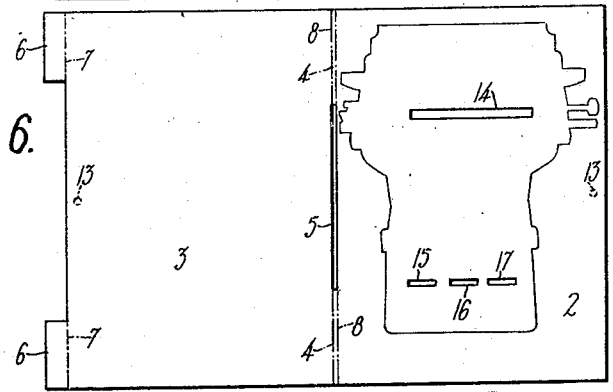
Inventor:
Jesse A B Smith
by B B Stickney
Attorney Patented July 17, 1928.

1,677,569

UNITED STATES PATENT OFFICE.

JESSE A. B. SMITH, OF STAMFORD, CONNECTICUT, ASSIGNOR TO UNDERWOOD ELLIOTT FISHER COMPANY, OF NEW YORK, N. Y., A CORPORATION OF DELAWARE.

ACCOUNTING-MACHINE DEMONSTRATION CHART.

Application filed May 19, 1925. Serial No. 31,258.

This invention relates to demonstration or exhibition charts for use in explaining the operations of a machine, especially by salesmen who deal in bookkeeping or similar machines which are too heavy to conveniently carry. It is in the nature of an improvement on the chart shown in the application of Julian S. Hexter, filed April 23, 1925, Serial No. 25,218.

In said application, a chart is used to demonstrate instead of the machine. The chart bears a photograph of an Underwood bookkeeping machine, showing the platen and the sight-openings of a plurality of registers. The chart further includes a slide containing the figures to be typed, and also containing the figures as they would appear in the registers of the machine after each typing operation. By means of tabs, the salesman may pull the slide step by step from one illustrative position to another, and expose the figures at the platen, and also at the sight-openings of the registers, and thus explain the successive steps without the aid of the actual machine.

According to the present invention, provision is made of a chart having a numeral-bearing disk or segment which is pivoted on a frame having sight-openings. Groups of figures are so arranged on the disk that, when the latter is swung, the figures can be quickly and accurately positioned at the proper sight-openings.

The chart-frame has two layers of cardboard hinged at an edge. The segment extends between said layers and is pivoted upon a rivet extending through the layers at a point near one edge. Holes in the photograph expose the figures at the registers. To expose the figures at the platen, the upper layer has an extended slot. Above the platen there is represented a collating table with headings. The several groups of figures printed tangentially on the disk when properly positioned will be accurately aligned under the proper headings, when the disk is swung the proper amount for each group.

Because of its easy positive operation, the device may be mailed with a suitable explanation to a prospect, who using it, may more thoroughly understand and appreciate the value of a bookkeeping machine.

Other features and advantages will hereinafter appear.

In the accompanying drawings,

Figure 1 is a plan view of the device.

Figure 2 is a partial sectional view along the line 2—2 of Figure 1.

Figure 3 is a cross-section along the line 3—3 of Figure 4.

Figure 4:
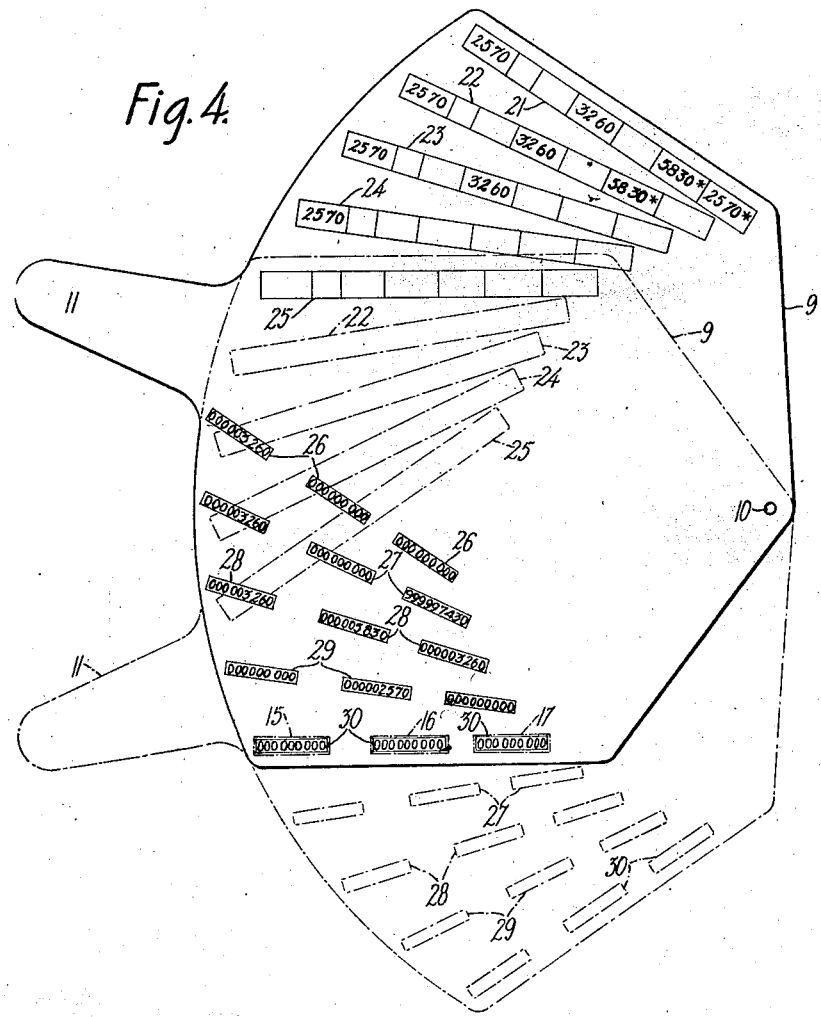
Figure 4 is a plan view of the disk, the dash-and-dot outline indicating a different position of the disk relative to its pivot.

Figure 5 shows the device with the print or photograph removed, but with its location outlined. The position of the disk is here indicated by dotted lines. Sight-openings are also indicated.

Figure 6 is a diagram on a reduced scale of a card-board blank from which the frame of the device may be made. The print or photograph is not shown, but its location is outlined.

The chart comprises a rectangular frame 1 having a top layer 2 and a bottom layer 3 secured at a long edge by a hinge portion 4 integral to both layers. The middle section of the hinge portion 4 may be cut away by a narrow lengthwise slot 5. The bottom layer 3 may have a separate flap 6 at each end of the side opposite the hinge 4 arranged to fold down about the crease lines 7. The flaps serve as spacer plates between the top and bottom layers 2 and 3 after they are folded about the crease lines 8. The flaps 6 may be secured by adhesive to both the top and bottom layers. The layers 2 and 3, the hinge 4 and the flaps 6 may be cut from a single blank of cardboard (see Figure 5). A cardboard disk or segment 9 having a hole 10 adjacent one side terminates in an arm 11 on the opposite side from the hole. The disk 9, on which entries and combinations of figures may be printed, is loosely pivoted between said layers 2 and 3 on a rivet 12 through the hole 10. This rivet is strongly clamped to both the top and bottom layers through holes 13 intermediate their ends and adjacent the edge opposite the hinge 4. The arm 11 may pass through the slot 5 beyond the edge of the frame 1 to serve as a handle. The arm 11 may strike against either end of the slot 5, and thereby serve as a stop in each direction. No part, except a short section of the arm 11, needs to project out beyond the frame 1.

Sight-openings 14, 15, 16 and 17 expose certain sets of numerals in specific relation to each other when said disk or slide 9 is manipulated. The heading of a ledger or work sheet 18 is mounted to appear to be held on the platen 19 and resting on the collating table 20.

Referring to slide 9, diagonal ruled-line sections 21, 22, 23, 24 and 25 with figures thereon (except section 25), representing ledger entries, are so located with respect to the group of figures 26, 27, 28, 29 and 30 that the numerals will appear in sight-openings in definite relation to certain of the aforesaid figures, as the latter are exposed to view upon manipulation.

A group of keys is shown at 31. Other keys and control buttons are shown at 32, 33, 34 and 35.

The machine is similar to the Underwood typewriter with computing and tabulating mechanism. It has a platen, type-bars, keys and number-bearing register disks.

The chart is placed on a desk, the slide or disk being in its normal uppermost position exposing at the sight-openings a set of zeros or such numerals as may be desired for this particular demonstration. The device is held in position by the pressure of the fingers on the upper corners of the frame. The disk or slide 9 is then slowly swung by means of the arm 11 until the first set of numerals is exposed at the proper sight-openings. Before moving the disk in this manner, the demonstrator may indicate the keys which would produce a similar result on the action of the machine.

To go more into detail, at the beginning of a demonstration (see Figure 1), the disk 9 is in its normal or uppermost position, thus exposing at each of the register sight-openings 15, 16 and 17 a set of zeros. The first operation to be demonstrated is the picking up of the previous debit balance $25.70 (see Figure 5). To do this, the disk 9 is swung downwardly until 25.70 of the disk appears in the pick-up column 36. At the same time this amount is thrown into the middle register 41. The next operation is to enter a debit of $32.60. To demonstrate this, the disk 9 is swung downwardly another step, thus exposing 32.60 in the debits column 37, and also showing the previously-typed amount in the pick-up column 36. This amount (32.60) is thrown into the register 40, which is an accumulator register; it is also added to the amount (25.70) previously run into the middle register 41, and it is also run into register 42, which is a proving register. The next operation to be demonstrated is the typing of the balance (58.30), which amount is copied from the middle register 41. The actual machine, when the carriage enters the balance column 38, is automatically set to subtraction. Consequently, the number as it is typed in said column is set up subtractively, and since it is copied from the middle register 41, said register clears when the number is run into it. To illustrate this operation, the disk 9 is swung downwardly another step, thus exposing 58.30 in the balance column 38, together with the amounts typed in the previous columns, and also showing the middle register 41 cleared. The star (*) key 33, which can be operated only when the register 41 is at zero, may then be operated to print the * opposite 58.30. The checking register 42 presents a series of "9's" followed by 74.30, which is a negative amount and equal to minus 25.70. Thus, when the amount (25.70) is copied into the proof column 39 from the pick-up column 36, the proving register 42 should return to zero, this amount being run into the proving register 42 additively. To demonstrate this operation, the chart is swung to the next and final position, thus exposing 25.70 in the proof column 39 and showing the proving register 42 cleared, whereupon the * may then be printed. The previously-typed figures are also visible at this time at the platen 19, and the accumulating register 40 shows the debit amount (32.60).

To begin a new demonstration, it is necessary to swing the disk 9 back to its normal position, which can be done without changing either hand. It is arrested by the upper end of the slot 5 which engages the arm 11, thus leaving the platen sight-opening 14 blank and exposing zeros in the registers 40, 41 and 42.

Variations may be resorted to within the scope of the invention, and portions of the improvements may be used without others.

Having thus described my invention, I claim:

1. A device for demonstrating the operation of an adding and typing machine comprising a frame having a top and a bottom layer hinged at one edge, on the face of one layer appearing the representation of the adding and typing machine the operation of which is to be demonstrated, the layer on which the representation appears having sight openings therein, one opening being located in the printing zone of said representation to disclose the number supposed to be typed on the typing machine and another opening in said layer at the counter cover represented in said representation, and a pivoted segment between said layers having numerals thereon arranged to be exposed to view in said sight openings on manipulation of said pivoted segments.

2. A device for demonstrating the operation of an adding and typing machine comprising a frame having a top and a bottom layer the top layer having thereon a representation of the machine, the demonstration of which is to be made, said layer having sight openings therein in that part of the representation illustrating the changes in the typing of the machine and also in that part of the representation of the machine illustrating the counter covers and the segment pivoted between the layers at one side thereof, stop means on said frame on the other side thereof, and an arm on said segment engageable with the stop means for limiting the movement of said segment.

3. In a demonstrating device, a frame having a representation of a computing machine on the face thereof, a segment pivoted thereto on the under side, stop means on said frame, and an arm on said segment engaging with the stop means of said frame for limiting the movement of said segment, apertures being cut through said frame to expose entries appearing on said segment.

4. A device for demonstrating the operation of a computing and typing machine comprising, a frame having an upper and a lower layer of cardboard integrally hinged at one edge, and stops at the other edge, said upper layer having a picture of a typewriting and computing machine and sight-openings through it, and a segment pivoted between said layers having entries arranged thereon for coming in registration with said sight-openings in said upper layer on manipulation of said segment and cooperating with said stops.

5. In a demonstrating device, a frame comprising an upper and a lower layer of cardboard integrally hinged at one edge, said layers separated on the opposite edge from said hinge by inwardly-folded flaps integral with said lower layer, said upper layer having thereon a picture of a machine and sight-openings through it exposing entries appearing on a segment pivotally arranged between said layers.

6. In a demonstrating chart for a typewriting and computing machine, a frame comprising a top and a bottom layer joined at one edge by a hinged portion integral to both layers, a lengthwise slot in said hinged portion, a pivoted segment between said layers having entries thereon, and an arm arranged to extend through said slot beyond said layers for swinging said segment, said top layer having a picture of said machine thereon, and sight-openings for exposing the entries on said segment.

7. In a demonstrating chart for a typewriting and computing machine, a frame comprising a top and a bottom layer joined at one edge by an integral hinged portion, said top layer having a picture of said machine thereon and sight-openings through it, said frame having a lengthwise slot in its middle section, and a numeral-bearing segment pivoted between said layers having an arm extending through said slot for swinging said segment about its pivot, said arm arranged to engage with the ends of said slot to limit the movement of said segment.

8. In a demonstrating device, a frame having thereon a picture of a typewriting and computing machine including a dummy sheet heading, an aperture being cut through said frame in a location relative to said dummy sheet on said picture required to expose the results of typing and other apertures to expose computing operations, and a segment pivoted to said frame on the under side having entries and corresponding numbers in position to register in said apertures at successive steps or stages of adjustment.

9. A computing machine demonstrating device, comprising a frame which has a representation of the machine including a work sheet heading on its face, said frame having cutouts, one at the work-sheet location and others at the sight-openings for the computing register, a segment pivoted to said frame on the under side thereof having on its face a succession of items representing entries on a ledger-sheet, and a series of numbers corresponding with said items, said items and said numbers positioned on said segment relative to its pivot for successively appearing in said work-sheet cutout and in said computing register cutout respectively when said segment is swung around its pivot.

10. In a demonstrating device for a computing machine, a two-layer cardboard frame having on the upper layer a picture of said machine and cutouts through said upper layer, and a segment having entries thereon pivoted between the layers of said frame, said frame being cut from a single sheet of cardboard and folded for assembling with said segment so that said entries can be viewed through said cutouts.

11. In a demonstrating device for computing machines, a two-layer cardboard frame having on the upper layer a picture of said machine and cutouts through said upper layer, and a segment having entries thereon provided with an arm for manipulation purposes pivoted between said layers, said frame being cut from a single sheet of cardboard with a slot between said layer portions and folded for assembling with said segment, in such a way that the entries on said segment can be viewed through the cutouts in said upper layer and the ends of said slot may engage with said disk-arm to serve as stops for limiting the movement of said segment.

12. In a demonstrating device for a typewriting and computing machine, a rectangular frame having an upper and a lower layer, said upper layer having thereon a picture of the machine and cutouts through it, a numeral-bearing segment pivoted between said layers adjacent a long edge thereof, arm means for swinging said segment about its pivot, and means in said frame for preventing the numeral-bearing portion of said segment from projecting out from said layers.

13. In a demonstrating device for typewriting and computing machines, in combination, a cardboard frame having an upper and a lower layer joined on one edge by an integral hinged portion, said hinged portion having a lengthwise slot therein, a rivet extending through and crimped over each of said layers, and a segment having entries thereon provided with an arm and pivoted about said rivet between said layers, said entries arranged to register in sight-openings through said frame on movement of said segment, said segment-arm arranged to project through said slot in said hinged portion of said frame.

JESSE A. B. SMITH.